United States Patent [19]

Iwai et al.

[11] 4,149,972

[45] Apr. 17, 1979

[54] WASTE WATER TREATING APPARATUS

[75] Inventors: Noboru Iwai, Osaka; Takashi Okumura, Moriguchi, both of Japan

[73] Assignee: Sekisui Kagaku Kogyo Kabushiki Kaisha, Osaka, Japan

[21] Appl. No.: 877,813

[22] Filed: Feb. 14, 1978

[30] Foreign Application Priority Data

Feb. 16, 1977 [JP] Japan .................................. 52/16605

[51] Int. Cl.$^2$ ................................................ C02C 1/04
[52] U.S. Cl. .................................................. 210/150
[58] Field of Search ........................ 210/17, 150, 151; 261/9 H

[56] References Cited

U.S. PATENT DOCUMENTS

| | | | |
|---|---|---|---|
| 3,335,081 | 8/1967 | El-Naggar | 210/151 X |
| 3,777,891 | 12/1973 | Stengelin | 210/150 |
| 3,904,525 | 9/1975 | Rosenberg | 210/150 |

*Primary Examiner*—John Adee
*Attorney, Agent, or Firm*—Wenderoth, Lind & Ponack

[57] ABSTRACT

A waste water treating apparatus comprising thin fan-shaped sheets made of an unfoamed synthetic resin and assembled via spacers. A tubular member made of a synthetic resin is inserted through holes in the fan-shaped sheets and holes in the spacers to form an assembly of the sheets. The assembly is radially disposed around a rotating shaft and forms a generally circular rotary body, the tubular member having a metallic core shaft inserted therein, and the core shaft being secured to a frame for holding the rotary body.

4 Claims, 6 Drawing Figures

100
WASTE WATER TREATING APPARATUS

BACKGROUND OF THE INVENTION

This invention relates to a waste water treating apparatus, and more specifically to a waste water treating apparatus of a built-up type.

The built-up type water treating apparatus itself is known. For example, Japanese Patent Publication No. 19786/74 discloses an apparatus including a rotary body which is made of generally circular plates positioned at intervals by spacers, each of the plates being a number of fan-shaped sheets disposed radially about a rotating shaft. This rotary body is disposed within a waste water treating tank, and the apparatus is operated by rotating the rotary body while it is dipped in waste water to a depth corresponding to about half of its height in the diametrical direction, and then treating the waste water by the action of aerobic microorganisms that grow adhering to the rotary body. The fan-shaped sheets which constitute the rotary body of this built-up type waste water treating apparatus are made of a synthetic resin foam, such as polystyrene foam, in order to permit good adhesion of the microorganisms and render the apparatus light in weight. A rotary body composed of a synthetic resin foam cannot retain sufficient strength unless its thickness is at least about 10 to 20 mm. Furthermore, a number of rotary bodies would have to be used to increase the total surface area of the rotary body and thereby increase the number of microorganisms which will adhere to it. Since the rotary bodies have a large thickness, the apparatus on the whole will become extremely large-sized. Furthermore, in this apparatus, many fan-shaped sheets are provided via spacers in the axial direction of the rotating shaft, and a bolt extends through the fan-shaped sheets and the spacers to form a bundle of the fan-shaped sheets. On the other hand, the bolt is secured to a brace mounted radially on the rotating shaft to fix the fan-shaped sheet bundle to the rotating shaft. Since the formation of a fan-shaped sheet bundle and its fixation to the rotating shaft are effected by a bolt, it is rather troublesome to build up the apparatus.

It is an object of this invention to provide a waste water treating apparatus which is free from the defects of the conventional built-up type waste water treating apparatus, and which is easy to build up, can be rendered small-sized, and has superior durability and an excellent ability to treat waste waters.

SUMMARY OF THE INVENTION

According to this invention, there is a waste water treating apparatus comprising a number of thin fan-shaped sheets of unfoamed synthetic resin having multiple through-holes and disposed via spacers. Each of the spacers being secured to the vicinity of each through-hole and has a projecting portion at its center and a through-hole conforming to the through-hole of the fan-shaped sheet. When a tubular member is inserted into the through-holes of the fan-shaped sheets and the through-holes of the spacers, the assembled structure of the fan-shaped sheets 1 is radially disposed around a rotary shaft to form a generally circular rotary body. The tubular member has a metallic core shaft inserted therein, and the core shaft is secured to a frame for holding the rotary body.

DETAILED DESCRIPTION OF THE INVENTION

Figure 4:
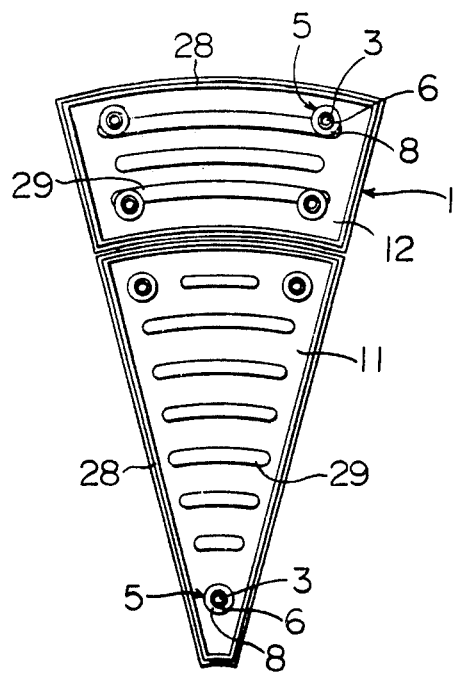
FIG. 4 is an enlarged front elevation showing a fan-shaped sheet having ribs.

The reference numeral 1 represents fan-shaped sheets which constitute a rotary body 2. The fan-shaped sheets are made of an unfoamed synthetic resin. The synthetic resin may be a thermoplastic resins, such as hard vinyl chloride resin or polyethylene resin, or thermosetting resins. The use of an unfoamed synthetic resin results in sufficient mechanical strength, even if the thickness of the fan-shaped sheet is small. The suitable thickness of the fan-shaped sheet in accordance with this invention is not more than 3 mm. In this case, the weight of the fan-shaped sheet is not great, and its mechanical strength is superior. When the fan-shaped sheet is made of a foamed synthetic resin, as in the conventional apparatus, its mechanical strength cannot be retained unless its thickness is 10 to 20 mm. The use of thin fan-shaped sheets 1 in this invention is effective for decreasing the size of the apparatus. In practice, the sufficient thickness of the fan-shaped sheet 1 is about 1 mm, and sometimes, fan-shaped sheets having a thickness of less than 1 mm can still retain mechanical strength. The fan-shaped sheet 1 may be formed on a single plate, but as shown in FIG. 4, may be formed of multiple sections 11 and 12. Preferably, ribs 28 and 29 are provided in the fan-shaped sheet 1. The rib 28 is formed on the peripheral edge of the fan-shaped sheet 1, and the rib 29, in the lateral direction. The ribs 28 and 29 serve to reinforce the fan-shaped sheet 1, increase the surface area of the fan-shaped sheet 1, and also cause the action of stirring waste waters. Multiple through-holes 3 are formed in the fan-shaped sheet to receive an inserted tubular member 4 for the formation of a superimposed structure of fan-shaped sheets 1. Spacers 5 are secured in the vicinity of the through-holes 3 of the fan-shaped sheet 1. The spacers 5 form spaces for the passage of waste water between the fan-shaped sheets when the fan-shaped sheets 1 are superimposed, and serve to improve the adhesion of microorganisms and contact with the air. A projecting portion 6 is formed in the center of each spacer 5 to secure a spacing between the fan-shaped sheets 1. At the center of each spacer 5, a through-hole 7 conforming to the through-hole 3 of the fan-shaped sheet 1 is formed so that the tubular member 4 may extend through these holes 3 and 7. A collar 8 is formed at the peripheral edge of the projecting portion 6. The collar 8 is suitable for securing the spacer 5 to the fan-shaped sheet 1 by an adhesive or a fixing device. The spacer 5 may be secured only to one side of the sheet 1, but if desired, it may be secured to both sides of the sheet 1. Any of these modes can be employed according to the spacing between the sheets 1.

Figure 1:
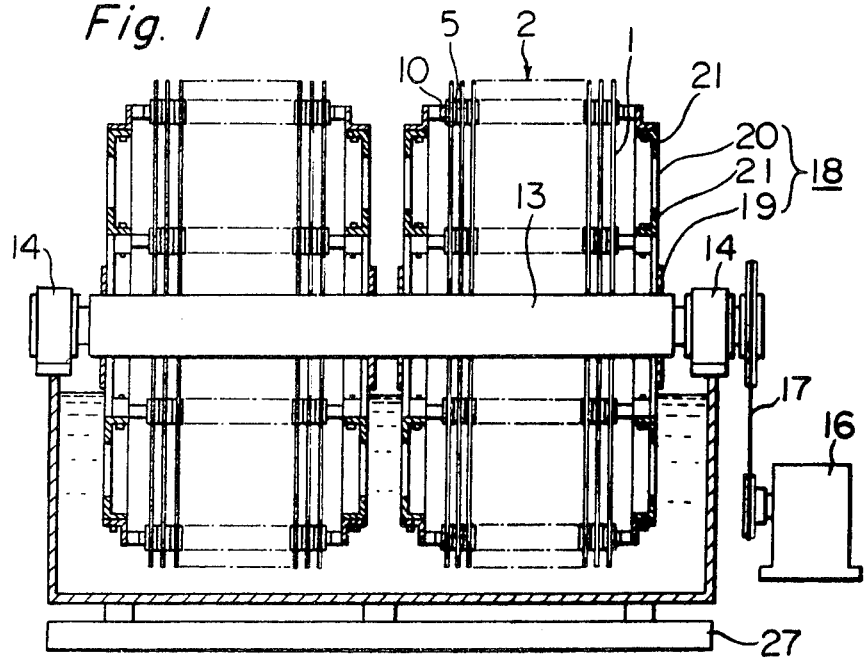
FIG. 1 is a front elevation, partly in section, showing one example of the waste water treating apparatus of this invention.
Figure 2:
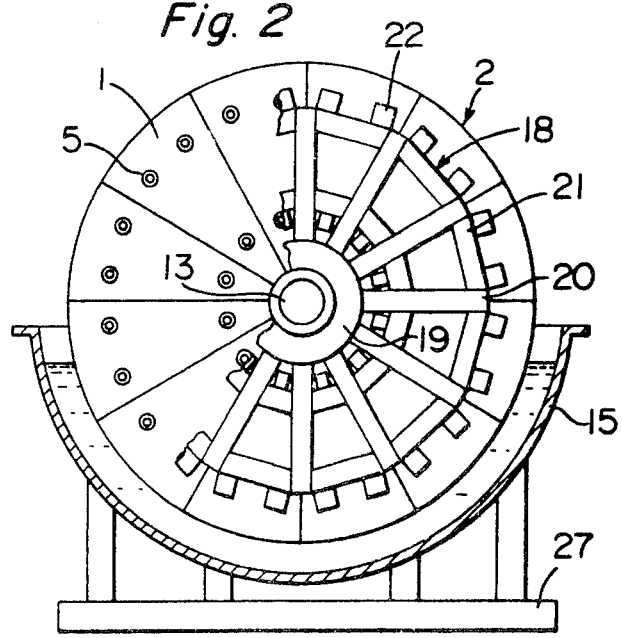
FIG. 2 is a side elevation partly in section showing a partly-broken-away view of FIG. 1.
Figure 3:
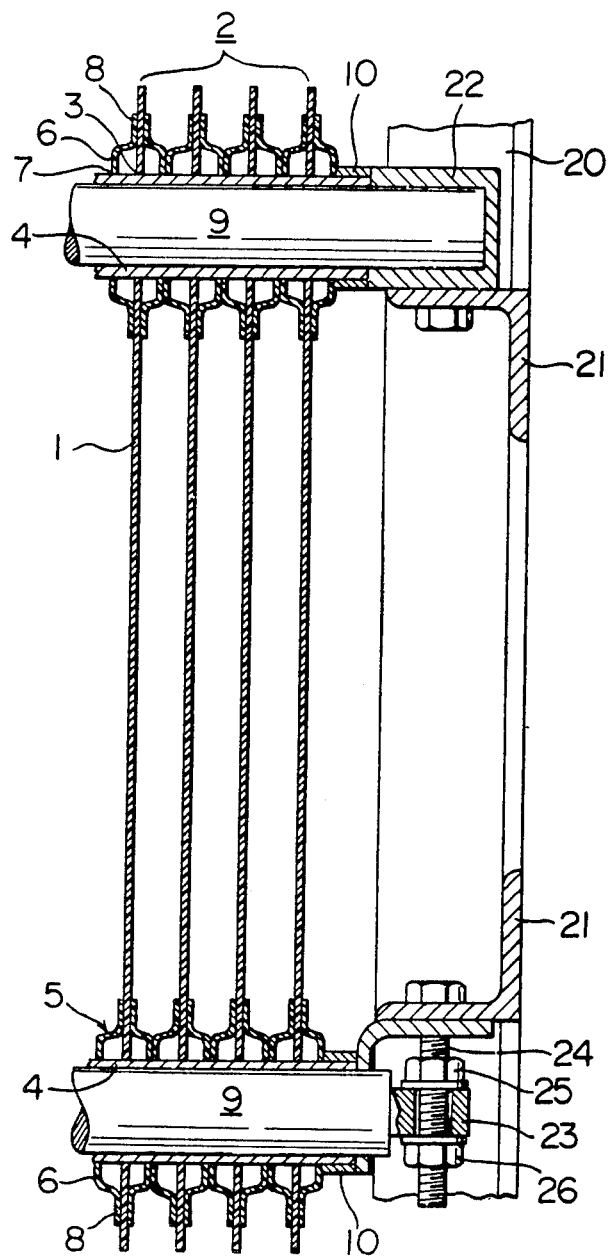
FIG. 3 is a partly-broken-away enlarged view showing an embodiment of securing fan-shaped sheets to a frame for holding a rotary body.

As shown in FIGS. 1 and 3, the tubular member 4 made of a synthetic resin is inserted in the through-holes 3 of the sheet 1 and the through-holes 7 of the spacers 5 to superimpose a number of sheets 1 via the spacers 5. The tubular member 4 is used to form a unitary structure of the fan-shaped sheets 1. A shaft of high strength can be created by inserting a metallic core shaft 9 into the tubular member 4. If the metallic core shaft 9 is directly inserted in the through-holes 3 and 7, the rotating force of the rotary body 2 concentrates on the edge portions of the through-holes 3 and 7 during the operation of the present apparatus, deformation or cracking occurs or the holes are enlarged, thereby reducing the durability of the holes. To avoid such an inconvenience, the core shaft 9 is inserted in the tubular member 4 made of a synthetic resin, thus allowing the synthetic resin to produce a buffering effect. The reference numeral 10 represents a fixing piece for preventing the escape of the sheets 1 in the sheet assembly.

Figure 5:
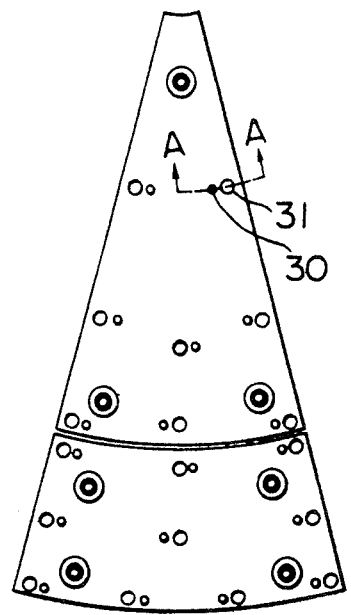
FIG. 5 is an enlarged front elevation of a fan-shaped sheet having raised and depressed portions.
Figure 6:
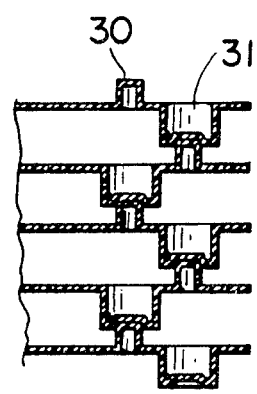
FIG. 6 is an enlarged sheet showing only the raised and depressed portions formed in the fan-shaped sheet, taken along the line A—A of FIG. 5.

The formation of raised portions 30 and depressed portions 31 in each fan-shaped sheet and the fitting of the raised and depressed portions of adjacent fan-shaped sheets into each other in the fan-shaped sheet assembly, as shown in FIGS. 5 and 6, is preferred, since the reinforcement of the fan-shaped sheets and the maintenance of spaces among the sheets are rendered more exact.

The assembly of fan-shaped sheets 1 formed as described hereinabove is disposed radially around a rotating shaft 13 and forms a generally circular rotating body 2. A space may be formed between two adjacent fan-shaped sheets 1, or the adjacent sheets 1 may contact each other closely. Likewise, a space may be provided between the sections 11 and 12 of the fan-shaped sheet 1, or these sections may make close contact with each other. Accordingly, the crosssectional shape of the rotary body is not necessarily a true circular shape. The term "generally circular rotary body", as used in the present application, should be construed to include the aforesaid case, also.

The rotating shaft 13 is supported at both ends by bearings 14, and the operation of a motor 16 provided outside a waste water treating tank 15 is transmitted to the rotating shaft 13 by a chain 17, etc. to rotate the shaft 13 at a low speed. The rotating shaft 13 may be a tubular structure.

A frame 18 for holding a rotary body is formed, for example, by an annular frame 19 fitted to the rotating shaft 13, longitudinal frame plates 20 fixed to the frame 19 at one end and radially extended, and a transverse frame plate 21 extending between adjacent longitudinal frame plates 20. Since the annular frame 19 serves only as a convenient means for fixing the longitudinal frame plates 20, it may be omitted when the longitudinal frame plates 20 are fixed directly to the rotating shaft 13.

The end of the metallic core shaft extending through the tubular member 4 is fixed to the frame 18. Fixation can be performed in various modes. One preferred method of fixation is to fix a short hollow cylindrical member 22 to the longitudinal frame plate 21 in advance, and then fit the core shaft 9 into the short hollow cylindrical member 22, as shown in FIG. 3. It is also possible, as shown in FIG. 3, to form a ring 23 for insertion of a fixed rod at the end of the core shaft 9, insert a fixed rod 24 one end of which is secured to the transverse frame plate 21, and fix it with nuts 25 and 26.

In the above examples, the end of the core shaft 9 is fixed to the transverse frame plate 21, but it can also be secured to the longitudinal frame plate 20.

The rotating shaft 13 is extended between the two ends, so that the rotary body 2 can be dipped in waste water to a depth corresponding to half of its height in the diametrical direction. The waste water treating tank 15 is supported on a stand 27.

In operation, when the rotary body 2 of this invention rotates, the rotary body 2 contacts the air outside the waste water to permit the growth of aerobic microorganisms effective for the treatment of waste waters. In the waste water, the microorganisms growing on the rotary body 2 contact the waste water to degrade degradable ingredients such as organic matter. According to this structure, contact of the waste water with air is good and the microorganisms grow well in the waste water. Hence, the degradation of the degradable ingredients in the waste water can be performed rapidly.

The rotary body 2 in accordance with this invention is formed of fan-shaped sheets made of an unfoamed synthetic resin, and thus, even if the sheet is thin, it can retain sufficient mechanical strength. The rotary body 2 which is formed by disposing a number of assembled fan-shaped sheets 1 around the rotating shaft 13 can be formed in a relatively small thickness, and therefore, the treating apparatus as a whole can be made small-sized. Furthermore, since a number of fan-shaped sheets 1 are assembled via spacers 5 by inserting the tubular member 4 of synthetic resin in the through-holes 3 of the sheet 1 and the through-holes 7 of the spacers 5, it is not necessary to secure the individual fan-shaped sheets 1 separately to the rotating shaft 13. Thus, an assembly of fan-shaped sheets 1 can be made in advance, and the apparatus can be built up easily. Furthermore, since the core shaft 9 is inserted in the tubular member 4, the fixing of the assembly of the fan-shaped sheets 1 can be radially disposed around the rotating shaft by merely securing the end of the core shaft 9 to the frame 18. Building of the apparatus is therefore easy.

What we claim is:

1. A waste-water treating apparatus comprising:
   a rotary shaft;
   a rotary body surrounding said shaft, said rotary body being comprised:
   a plurality of adjacent fan-shaped sheets of unfoamed synthetic resin radially postioned around said rotary shaft, each sheet being comprised of at least two fan-shaped members radially spaced from said rotary shaft, and each fan-shaped member having a plurality of holes therethrough aligned with holes in the next adjacent fan-shaped member, and
   a plurality of spacer means between said fan-shaped members and between said aligned holes in said fan-shaped members for spacing said fan-shaped sheets apart, each spacer means being comprised of a projecting portion spaced away from one of said fan-shaped members and having an opening therethrough between said aligned holes in said fan-shaped members, and a collar extending from said projecting portion connecting said projecting portion and said fan-shaped member;
   a plurality of tubular members of synthetic resin positioned through said aliged holes in said fan-shaped members and said openings in said projections of said spacer means;
   a plurality of metallic cores through said tubular members;

framing means at the ends of said rotary shaft for holding said rotary body onto said shaft, said framing means being connected to said shaft and said metallic cores through said tubular member; and
rotating means connected to said rotary shaft for rotating said shaft and said rotary body connected thereto.

2. An apparatus as claimed in claim 1, wherein said unfoamed synthetic resin is a hard vinyl chloride resin or polyethylene resin.

3. An apparatus as claimed in claim 1, wherein ribs are formed on said fan-shaped members.

4. An apparatus as claimed in claim 1, wherein raised and depressed portions are formed on said fan-shaped members.

* * * * *